Oct. 16, 1956    H. R. RUHR    2,766,468
MACHINES FOR ROUGH ROUNDING
Original Filed May 11, 1953    2 Sheets-Sheet 1

Inventor
Heinrich R. Ruhr
By his Attorney

Inventor
Heinrich R. Ruhr
By his Attorney

United States Patent Office 2,766,468
Patented Oct. 16, 1956

2,766,468

MACHINES FOR ROUGH ROUNDING

Heinrich Richard Ruhr, Frankfurt am Main, Germany, assignor, by mesne assignments, to United Shoe Machinery Corporation, Flemington, N. J., and Boston, Mass., a corporation of New Jersey Original application May 11, 1953, Serial No. 354,252, now Patent No. 2,727,261, dated December 20, 1955. Divided and this application April 30, 1954, Serial No. 426,731

12 Claims. (Cl. 12—85)

This invention relates to improvements in machines for rough rounding shoe soles, and is illustrated herein as embodied in a machine suitable for practicing the method of rough rounding disclosed in my United States application Serial No. 354,252, filed on May 11, 1953, now Patent No. 2,727,261, granted on December 20, 1955, of which this application is a division.

As the rough rounding operation is ordinarily carried out, a succession of cuts is made across the sole edge along the desired contour by a chopping knife which cuts against an anvil for supporting the work. The engagement of the knife edge with the anvil, even though the latter is usually provided with a brass insert opposite to the knife, causes progressive dulling and shortening of the knife. Consequently, there is a tendency for the knife not to penetrate the work completely and for the formation of a fringe or fin at the side of the work supported by the anvil.

An object of the present invention is to provide for the performance of the rough rounding operation in such a manner that, without dispensing with the advantages of a chopping knife, the complete severance of the work is effected although the rounding knife is not brought into engagement with the anvil.

With the foregoing in view, the invention provides novel rounding machine structure which, as embodied in the illustrative machine disclosed herein, includes a chopping blade mounted for movement toward and away from one portion of a work supporting anvil without striking it, and a shearing blade movable across another portion of the anvil in shearing relation thereto so as to complete the severance of the work not penetrated by the chopping knife. As herein illustrated, the chopping and shearing blades, although separate parts, constitute in effect one knife, and the shearing blade, which is situated at the trailing side of the chopping blade, operates during each stroke of the chopping knife but upon the portion of the work not cut during the previous stroke of the chopping blade.

The above and other features of the invention will now be described in detail with reference to an illustrative machine shown in the accompanying drawings, and will be defined in the claims.

Figure 1:
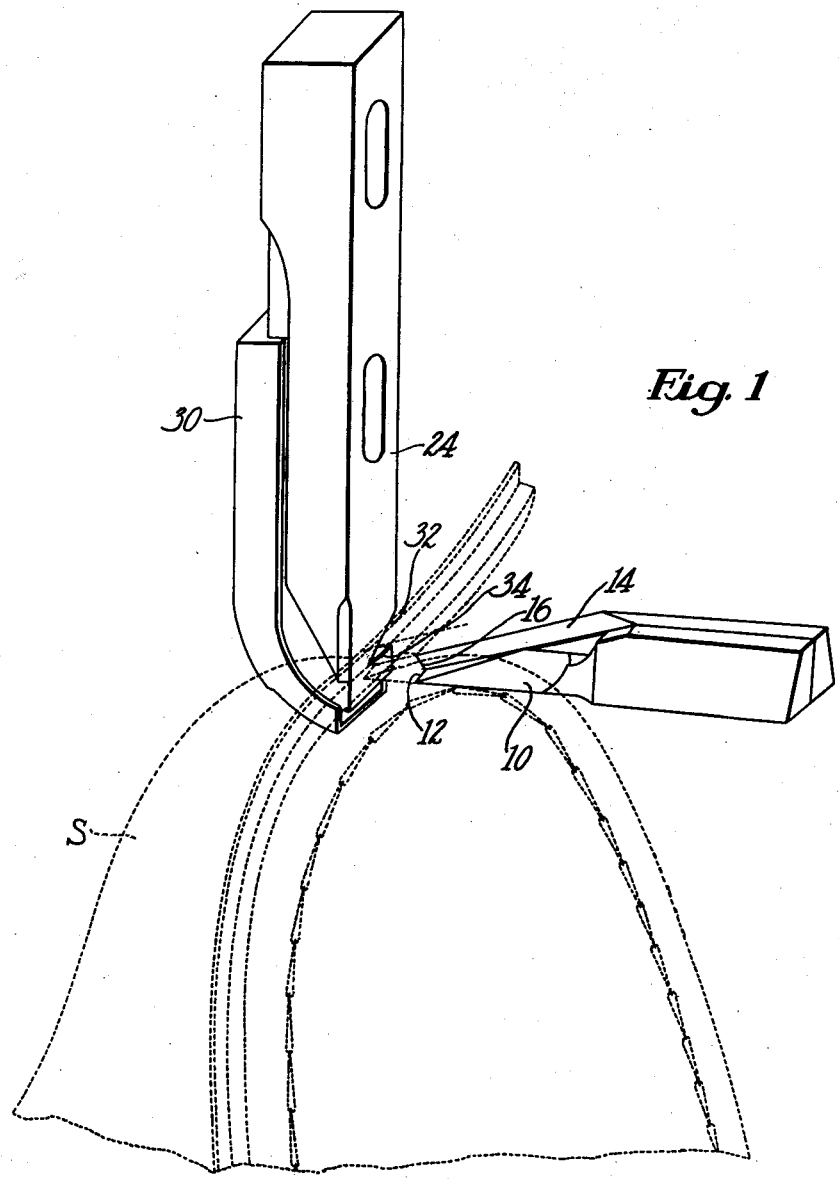
Fig. 1 is a perspective view of only the work engaging instrumentalities of an illustrative machine embodying the invention, the rounding knife being shown at the beginning and end of its cutting stroke in solid and broken lines, respectively.
Figure 2:
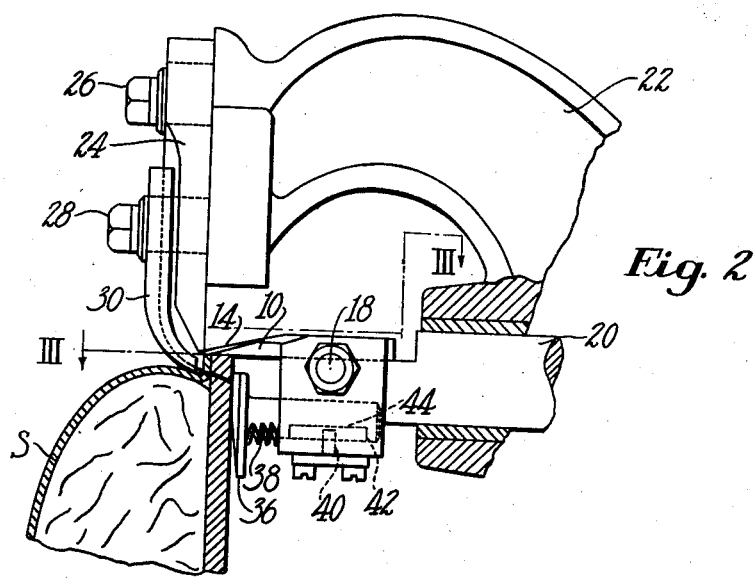
Fig. 2 is a sectional side elevation of the machine with the knife at the end of its cutting stroke.
Figure 3:
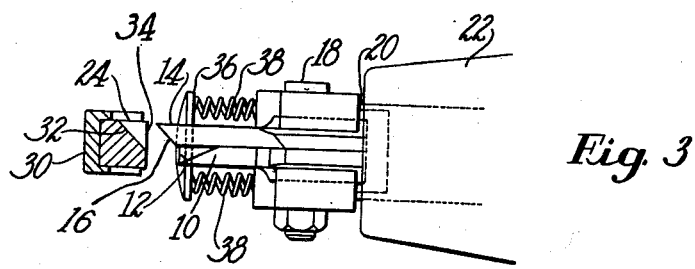
Fig. 3 is a sectional plan view of structure shown in Fig. 2 but with the knife retracted, the section being taken along the line III—III of Fig. 2.

The rounding knife of the illustrative machine comprises a chopping blade 10 having a cutting edge 12 at a right angle thereto and a shearing blade 14 having a skewed cutting edge 16 in the same plane with and disposed at an obtuse angle to the edge 12. The blades, with their cutting edges contiguous to each other, are clamped side by side by a bolt 18 within a dovetail socket at the forward end of a carrier or slide 20 which is mounted to reciprocate in the frame 22. Any suitable driving mechanism for the slide 20 may be employed such, for example, as that disclosed in United States Letters Patent No. 1,474,347, granted November 20, 1923, upon an application filed in the name of R. E. Duplessis.

A shoe S to be rounded is supported against the thrust of the knife by an anvil 24 which is secured to the frame by screws 26, 28, the latter passing through elongated holes in the anvil for permitting it to be adjusted heightwise relatively to the knife. A guide 30, clamped against the forward side of the anvil by the screw 28, is adapted to bear at its lower end against the side of the shoe upper adjacent to the welt crease, and is adjustable vertically to vary the sole edge extension.

When the slide 20 is at the forward end of the cutting stroke the edge 12 of the chopping knife 10 is in proximity to, without touching, a portion of the anvil 24 somewhat above its lower end. Accordingly, the work is not completely penetrated or severed by the chopping knife, but it is supported against the thrust of the knife both inwardly and outwardly thereof from the line of cut. With the knife in this position, the shearing blade 14 is received within a notch 32 formed in the anvil in such a manner that the upper side of the notch is not engaged by this blade. The lower side of the notch is defined by a shoulder and shearing edge 34 which is disposed at the level of and in shearing relation to the cutting edge 16 of the shearing blade 14.

Shortly after the cutting stroke of the knife begins the shoe is held yieldingly against the anvil by a presser 36 which is mounted to slide freely in the slide 20 lengthwise thereof. The presser is urged outwardly of the slide by springs 38, 38 compressed between the presser and the end of the slide, such outward movement being limited by the engagement of a pin 40, fixed to the slide, with an abutment 42 at the rear end of an elongated slot 44 in the presser which receives the pin. This pin and abutment 42 are so arranged that the presser projects very slightly in front of the cutting edge 12 before the presser engages the work. For this reason, clamping pressure is applied to the shoe before the cutting action of the chopping knife 10 begins, this clamping pressure being progressively increased as the springs 38, 38 are compressed during the cutting stroke. The presser also holds the shoe against the anvil during the retractive movement of the knife until shortly after the chopping blade is moved out of the kerf, when the presser moves away from the shoe bottom. Thereafter, while the knife is retracted to the end of its return stroke and until it is advanced to bring the presser again into contact with the shoe, the latter is free to be moved through a short feeding movement to present an uncut portion of the sole to the chopping knife 10 and to present to the shearing blade 14 the thin portion of the work which was not penetrated by the previous cutting stroke of the chopping blade.

The stroke of the knife is sufficient, with relation to the thickness of the thickest work for which the machine is designed, to cause the chopping blade 10 always to be moved rearwardly beyond the bottom of the shoe at the end of its retractive stroke, so as not to impede the feeding of the work at this time. However, the shearing blade may or may not have been removed from the kerf, depending upon the thickness of the work. Even if the shearing blade is not drawn out of the kerf it does not prevent a proper feeding movement from being imparted to the work, and does not limit such movement until the end of the kerf last made by the shearing blade is advanced into engagement with its cutting edge 16.

In rounding a shoe by the use of the illustrated machine, the shoe is presented to the machine with the side of its upper in engagement with the guide 30, the latter having been adjusted relatively to the knife to obtain the desired sole edge extension. The upper surface of the outwardly flanged marginal portion of a shoe of the stitchdown type, as illustrated herein, or the upper surface of the welt of a welt shoe is supported by the anvil 24, which will have been adjusted to bring its shearing edge and shoulder 34 to the level of, and in shearing relation to, the cutting edge 16 of the shearing blade 14. It is to be understood also that the chopping knife 10 will have been adjusted on the carrier 20 so that at the end of its forward stroke, when the cutting stroke of the chopping blade is completed, its cutting edge 12 will have been moved into proximity to but not into contact with the anvil.

The chopping blade during each cutting stroke passes through the greater part of the combined thickness of the sole and whatever shoe parts are above it such as the outwardly flanged upper or welt, as the case may be, but without penetrating the upper or welt completely. After the chopping blade has been removed from the work during its return stroke the work is fed to the left to bring the portion of the work not penetrated by the previous chopping cut into the field of action of the shearing blade 14, and to advance an uncut portion of the work into the field of action of the chopping blade. During the next cutting stroke of the knife, while the chopping blade is making a new cut in the work, the shearing blade, cooperating with the shoulder 34 on the anvil, makes a shearing cut upon the portion of the work which was not severed by the last chopping cut, this shearing action being advanced toward the right from the end of the previous shearing cut into proximity to the new chopping cut. Thus, by following each incomplete chopping cut with a shearing cut which completes the severance of the work not penetrated by the preceding chopping cut, the marginal portion of the shoe is rounded to the desired contour with assurance that the chip will be completely severed from the work even though the chopping knife is not brought into engagement with the anvil.

The steadiness of the work is furthered during the rounding operation by the presser 36 which, bearing against the shoe bottom opposite to the anvil, yieldingly holds the upper side of the margin of the shoe against the anvil except for short periods at the beginning of the cutting stroke of the knife and at the end of its return stroke. That is, when the knife and carrier are retracted far enough to remove the presser from the shoe bottom, the work engaging surface of the presser projects slightly in front of the cutting edge 12 of the chopping knife 10. However, soon after the cutting stroke begins the presser engages the shoe bottom and begins to hold the shoe against the work. Thereafter, during the cutting stroke the presser, under the influence of the springs 38 applies an increasing pressure to the shoe bottom. Although the presser is now stationary in engagement with the shoe bottom, it yields rearwardly within the carrier 20 until the cutting stroke of the knife is terminated. Similarly, during the return stroke of the knife the presser moves forwardly out of the carrier and holds the shoe against the anvil with a progressively diminishing pressure, which always is sufficient to prevent the work from being retracted with the knife, until just after the chopping blade is moved away from the work. At this time, the pin 40 is engaged by the abutment 42 on the presser, whereby any further retractive movement of the knife is also imparted to the presser. Throughout the remaining short portion of the return stroke of the knife the work is no longer clamped against the anvil, and is free to be moved with a feeding movement until the shoe bottom is again engaged by the presser soon after the beginning of the next cutting stroke.

Having thus described my invention, what I claim as new and desire to secure by Letters Patent of the United States is:

1. In a machine for rounding the sole edge of a shoe, an anvil, a chopping blade movable toward and away from one portion of said anvil without crossing the plane of its work engaging surface to make a succession of incomplete rounding cuts directed against said anvil along the desired outline of the sole, and a shearing blade mounted for movement across another portion of said anvil in shearing relation thereto to complete the severance of the work not penetrated by the chopping blade.

2. In a rounding machine, an anvil having a shearing edge, a chopping blade movable into juxtaposition to said anvil from one side of the sole of a shoe supported at its other side by said anvil to make an incomplete rounding cut along the desired outline of the sole, and a shearing blade mounted for movement across said shearing edge in shearing relation thereto for severing the portion of the work not penetrated by said chopping blade.

3. In a machine for rounding the sole edge of a shoe, an anvil, a reciprocatory chopping blade movable into proximity to one portion of said anvil through one side of the sole of a shoe without penetrating its other side which is supported by said anvil, and a reciprocatory shearing blade movable across another portion of said anvil in shearing relation thereto, said shearing blade being arranged to cooperate with said anvil during each shearing stroke to complete the severance of the portion of the work which the chopping blade failed to penetrate during the preceding chopping cut.

4. In a sole rounding machine, a chopping blade movable crosswise of the sole edge of a shoe presented thereto, an anvil one portion of which is arranged to support the shoe both inwardly and outwardly thereof from the chopping cut and opposite thereto, and a shearing blade mounted for movement in shearing relation with respect to another portion of said anvil, the last-mentioned portion of said anvil being arranged to support the shoe inwardly thereof only from the shearing cut.

5. In a rounding machine, an anvil having a shearing edge, a chopping blade movable across the sole edge of a shoe supported by said anvil and into proximity to a portion of said anvil in continuation of said shearing edge to make a succession of incomplete rounding cuts along the desired outline of the sole, and a shearing blade mounted in shearing relation to said shearing edge for severing the portion of the work not penetrated by said chopping blade.

6. In a rounding machine, a reciprocatory rounding knife having a chopping blade and a shearing blade arranged to project forwardly of said chopping blade, the cutting edges of said blades being in the same plane, and an anvil disposed in proximity to said chopping blade at the end of its cutting stroke and arranged to support the work at each side of said plane, said anvil also being arranged to support the portion of the shoe inwardly thereof from the line of cut which is acted upon by said shearing blade.

7. In a machine for rounding the sole edge of a shoe, an anvil, a reciprocatory chopping blade movable up to but without striking said anvil, said anvil being arranged to support the margin of the sole against the thrust of said blade at each side of its cutting plane and having a shearing edge disposed in said cutting plane, and a reciprocatory shearing blade arranged to cooperate with said shearing edge to sever a portion of the work which said chopping blade failed to penetrate.

8. In a machine for rounding the sole edge of a shoe, a reciprocatory knife having chopping and shearing blades the cutting edges of which are contiguous and are disposed at an obtuse angle to each other, and an anvil for supporting the shoe at each side of the cut made by said chopping blade, said anvil being overlapped by said shearing blade at the forward end of the stroke of said knife and being arranged to support the shoe inwardly thereof from the cut made by said shearing blade.

9. In a machine for rounding the sole edge of a shoe, an anvil having a shearing edge, a reciprocatory chopping blade, and a reciprocatory shearing blade arranged to cooperate with said shearing edge, the cutting edge of said shearing blade being arranged to project forwardly from one end of the cutting edge of said chopping knife and at an obtuse angle thereto.

10. In a rounding machine, an anvil, and a reciprocatory rounding knife having a chopping blade movable into proximity to said anvil to make a succession of incomplete rounding cuts across the sole edge of a shoe along the desired outline of its sole, said knife also having a shearing blade projecting forwardly of said chopping blade at the trailing side thereof, said anvil having a shearing edge with which said shearing blade is arranged to cooperate during each cutting stroke of said knife to sever the portion of the work not cut by said chopping knife.

11. In a rounding machine, an anvil having a notch therein defined on one side by a shearing edge, and a reciprocatory rounding knife having a chopping blade movable across the sole edge of a shoe into proximity to said anvil to make a succession of incomplete cuts along the desired outline of its sole, said knife also having a shearing blade arranged to enter said notch and to cooperate with said shearing edge during each cutting stroke of said knife to sever the portion of the work which said chopping knife failed to penetrate during the preceding stroke of said chopping knife.

12. In a machine for rounding the sole edge of a shoe, an anvil having a shearing edge, and a reciprocatory knife having a chopping blade and a skewed shearing blade, said chopping blade being movable into proximity to said anvil to make an incomplete rounding cut across the sole edge between successive feed movements of the work, said skewed shearing blade being movable across said shearing edge progressively to advance the complete severance of the work along the line of cut up to the last cut made by said chopping blade.

References Cited in the file of this patent
UNITED STATES PATENTS

| | | |
|---|---|---|
| 463,982 | Briggs | Nov. 24, 1891 |
| 1,117,303 | Ballard | Nov. 17, 1914 |
| 1,118,883 | Valois | Nov. 24, 1914 |
| 1,375,676 | Cosgrove | Apr. 26, 1921 |
| 1,398,524 | LaFleur | Nov. 29, 1921 |
| 1,702,670 | Slater | Feb. 19, 1929 |